Sept. 19, 1944. C. A. PRATT 2,358,416
SHAKER CONVEYER
Filed April 21, 1943 5 Sheets-Sheet 1

INVENTOR
Charles A. Pratt
Clarence F. Poole
ATTORNEY

Sept. 19, 1944.　　　C. A. PRATT　　　2,358,416
SHAKER CONVEYER
Filed April 21, 1943　　　5 Sheets-Sheet 4

INVENTOR
Charles A. Pratt
Clarence F. Poole
ATTORNEY

Sept. 19, 1944.  C. A. PRATT  2,358,416
SHAKER CONVEYER
Filed April 21, 1943   5 Sheets-Sheet 5

INVENTOR.
Charles A. Pratt
BY
Clarence F. Poole
ATTORNEY

Patented Sept. 19, 1944

2,358,416

UNITED STATES PATENT OFFICE 2,358,416

SHAKER CONVEYER

Charles A. Pratt, Chicago, Ill., assignor to Goodman Manufacturing Company, Chicago, Ill., a corporation of Illinois Application April 21, 1943, Serial No. 483,875

15 Claims. (Cl. 198—220)

This invention relates to improvements in shaker conveyers and more particularly relates to an improved form of loading device for loading material onto a conveyer trough line.

Shaker conveyer loading devices of the self-feeding type have heretofore been extensively used for loading coal in mines. Their use, however, has been limited in that the loading device is usually reciprocably driven from a main shaker conveyer trough line and is pivoted to and forms an extension of the inby end of the trough line. Movement of the loading device is thus restricted and it is difficult to load from the extreme corners of a working place, and it is not possible to load at right angles to the main trough line, due to the length of the reciprocating and extensible troughs of the loading device made necessary to permit the required lateral movement of the loading device and to permit extension of the loading device without adding additional troughs to the trough line. Also, due to this necessary length of the usual shaker conveyer loading device, the working place cannot be loaded out by the device until it has first been loaded out by hand a distance sufficient to permit accommodation of the loading device.

The principal objects of my invention are to remedy these difficulties by providing an independently operated shaker conveyer loading device and by providing a material transfer means to connect this loading device to a main conveyer line, to control movement thereof with respect to the conveyer line and to increase the mobility of the loading device with respect to the conveyer line so as to enable material to be continuously loaded onto the conveyer line.

A more specific object of my invention is to provide a shaker conveyer loading unit mounted for slidable movement along the ground and to connect this loading unit with a main conveyer line by means of an independent conveying unit which is arranged to transfer material from the loading unit to the receiving end of the conveyer line and which also serves to hold the loading unit in spaced relation with respect to the conveyer line and permits it to move with respect to the conveyer line about a pair of parallel spaced vertical axes.

Other objects of my invention will appear from time to time as the following specification proceeds and with reference to the accompanying drawings wherein.

In the embodiment of my invention illustrated in the drawings, a main conveyer line 10 is shown as being mounted at its forward end on a base 11 adapted to be held in a stationary position on the ground, during operation of the conveyer, by jacks 12, 12, set between said base and the mine roof in a usual manner. Said main conveyer line may be of any well known form, but is herein preferably shown as being a reciprocating conveyer driven from a usual type of reciprocable drive mechanism (not shown), in such a manner that the reciprocating motion of the conveyer line will cause material to move therealong from the inby to the outby end thereof.

Figure 3:
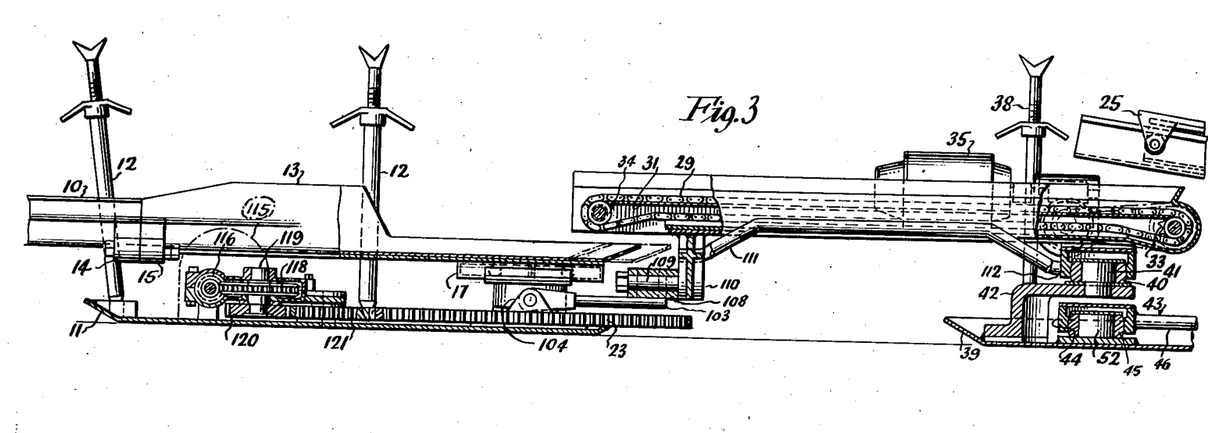
Figure 3 is a view in side elevation of the rear part of the loading device shown in Figure 1, drawn to substantially the same scale as Figure 2 and showing certain parts broken away and certain other parts in longitudinal section.

The main conveyer line 10 has a hopper-like trough 13 detachably secured to its forward end, as by connecting bolts 14, 14 extending through aligned connecting eyes 15, 15 (see Figure 3). Said hopper-like trough is mounted on the base 11 for reciprocable movement with respect thereto on a usual type of ball frame, herein shown as including an upper frame 16 secured to the underside of said trough and reciprocably mounted on a lower frame 17 on balls 18, 18 (see Figures 3 and 5). Said lower frame is mounted on said base 11 for pivotal movement with respect thereto about a vertical axis and for limited movement with respect thereto in a plurality of vertical planes on a convex or semi-ball-shaped bearing member 19 (see Figure 5). Said bearing member is mounted on the upper end of a vertical shaft 20, which is secured to and projects upwardly from the base 11. A retaining plate 21 secured to the upper end of said shaft serves to hold said bearing in position on said shaft.

Figure 5:
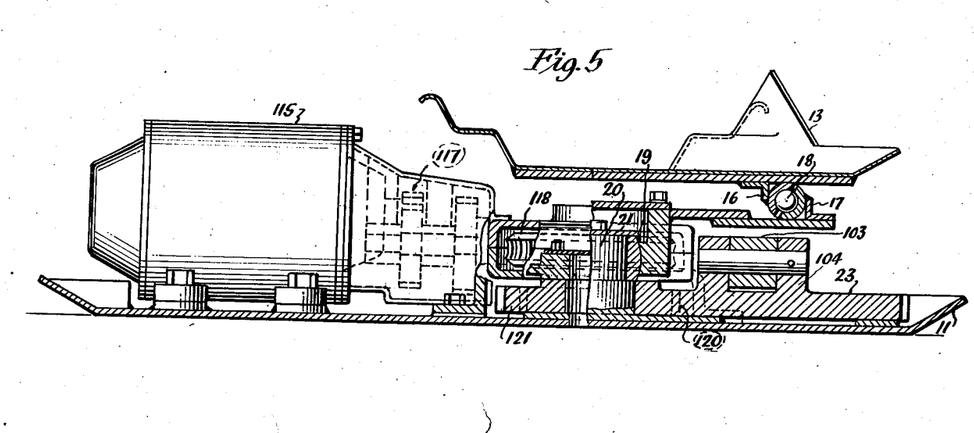
Figure 5 is an enlarged transverse sectional view taken through the forward part of the main conveyer line and showing certain details of the support for the forward end thereof and of the drive for swinging the transfer conveyer about its axis of connection to the base for the main conveyer line.

A spur gear 23 is mounted on the vertical shaft 20, just below the bearing 19, and is provided to form a vertical pivotal connection for the discharge end of an intermediate transfer conveyer 24 to the base 11. Said transfer conveyer serves to connect a gathering unit 25 to said main conveyer line for horizontal movement with respect thereto about a pair of parallel spaced vertical axes, and forms a means to transfer material from said gathering unit to said conveyer in all positions of said gathering unit with respect to said main line conveyer. Said gathering unit may be of various well known forms, but is herein shown as being an independent shaker conveyer loading device.

Figure 4:
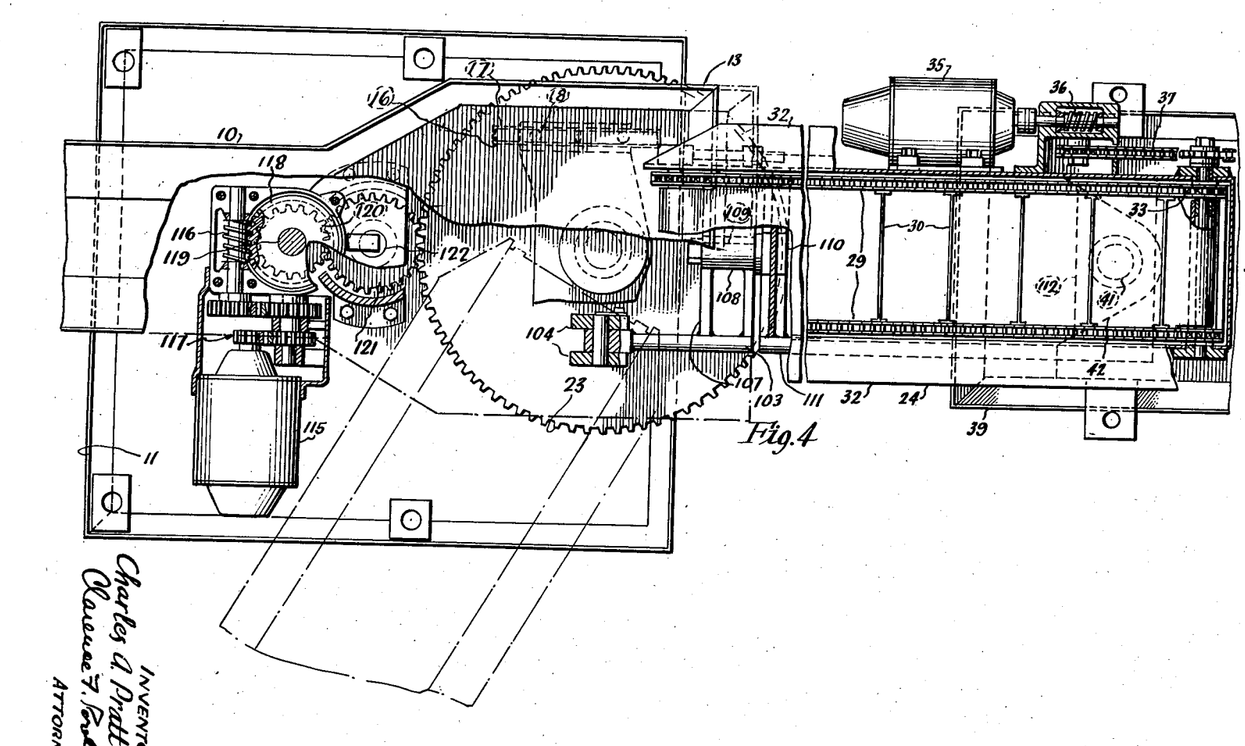
Figure 4 is an enlarged plan view of the rear part of the loading device with certain parts broken away and certain other parts shown in horizontal section in order to show certain details of the transfer conveyer and the connection therefrom, to the main conveyer line.

The transfer conveyer 24 may be of any form well known to those skilled in the art and, as herein shown, is a chain conveyer consisting of a pair of parallel spaced endless chains 29, 29 having flights 30, 30 connected therebetween and movable along a material supporting plate 31, connected between sides 32, 32 of the frame for said conveyer. Said endless chains are trained along said plate from drive sprockets 33, 33 at the receiving end of said conveyer, to and around idlers 34, 34 at the discharge end of said conveyer and underneath said plate to said drive sprockets (see Figure 4). Said shaft and drive sprockets are driven from a motor 35, herein shown as being mounted on one of the sides 32, 32, through a worm gear reduction 36 and a chain and sprocket drive indicated generally by reference character 37 (see Figure 4).

Figure 8:
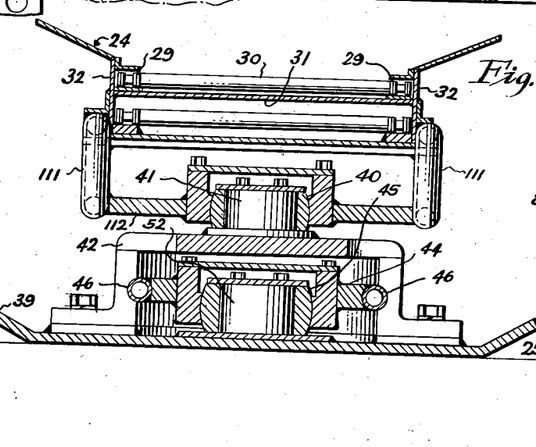
Figure 8 is a transverse sectional view illustrating the connection from the receiving end of the transfer conveyer to the loading device.
Figure 9:
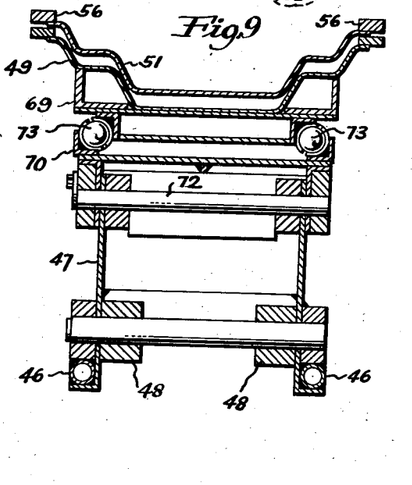
Figure 9 is an enlarged transverse sectional view taken substantially along line 9—9 of Figure 2.

The transfer conveyer 24 is pivotally mounted on a base 39 with its receiving end disposed beneath the discharge end of the gathering unit 25. Said base is mounted on the ground for slidable movement therealong, but may be held stationary during the loading operation by jacks 38, 38 (see Figures 1 and 3). The mounting for said transfer conveyer on said base includes a semi-ball-shaped bearing member 40 which is mounted on a vertical shaft 41 (see Figures 3 and 8). Said vertical shaft is mounted on and projects upwardly from a bracket 42, secured to said base and extending over a link 43, which serves to pivotally connect said gathering unit to said base and which is journaled at its rear end on said base for movement about an axis coaxial with the axis of connection of said conveyer to said base.

The mounting for the transfer conveyer 24 on the gear 23 and the base 39 includes a pair of parallel spaced arms 103, 103 pivotally connected at their rear ends between two pairs of laterally spaced lugs 104, 104, secured to and projecting upwardly from the top of said gear. Said arms extend forwardly from said lugs and are connected together by a transverse bridge 107. Said transverse bridge is provided with a central boss 108 having a longitudinally extending aperture adapted to receive a pivotal pin 109. Said pivotal pin projects rearwardly from and forms a pivotal support for a transverse supporting frame 110, depending from the bottom of the conveyer 24 and forming a support therefor (see Figures 3 and 4). A pair of tubular frame members 111, 111 extend forwardly from opposite sides of said transverse supporting frame along the transfer conveyer, and form a support for said transfer conveyer. Said tubular frame members are connected at their forward ends with a transverse support member 112, which is journaled on the ball-shaped bearing member 40, mounted on the vertical shaft 41.

The link 43 includes a cross frame member 44 mounted on a semi-ball-shaped bearing 45, which is mounted on a vertical shaft 52, disposed just beneath the vertical shaft 41. A pair of parallel spaced tubular frame members 46, 46 are secured to opposite sides of said cross frame member, and extend forwardly therefrom. The forward ends of said tubular members are secured to the opposite outer sides of a supporting leg 47 for the rear end of a reciprocating trough 49 of the gathering unit 25. Said leg is pivotally mounted on a pair of spaced brackets 48, 48, projecting rearwardly from a base 50 for said gathering unit, and serves to connect said link 43 to said base and permit pivotal movement of said base with respect to said link about a transverse axis.

The frame members 46, 46 and transfer conveyer thus space the base 11 from the base 50, and connect the gathering unit to said base 11, for movement about a pair of parallel spaced vertical axes and about a plurality of parallel horizontal axes, to permit said gathering unit to be readily maneuvered about said bases 11 and 39, and permit said bases 39 and 50 to accommodate themselves to an irregular mine bottom.

The gathering unit 25 includes the reciprocating trough 49 reciprocably mounted at its rear end on the upper end of the supporting leg 47 and at its forward end on an extensible trough 51, mounted for telescopic extensible or retractible movement with respect to said reciprocating trough. Said extensible trough has a pick-up member or shovel 53 extending from its forward end and communicating therewith, which forms a means for picking up material from the ground and forms a slidable support for the forward end of said extensible trough on the ground.

A feeding device indicated generally by reference character 54 is shown as being provided to extend the extensible trough 51 and shovel 53 into the material it is desired to load. Said feeding device may be of any well known form, but is herein shown as being a friction grip feeding device somewhat similar to that shown and described in the Bergmann patents, Nos. 2,186,472 and 2,278,302, and is no part of my present invention, so will only herein be described in so far as is necessary to make my invention readily understandable. Said feeding device includes the usual friction grip blocks 55, 55 engageable with the upper and lower sides of bearing plates 56, 56 extending along each side of the extensible trough 51 and projecting laterally from the upper ends thereof. A control lever 57 is pivotally mounted in a pair of laterally spaced brackets 58, 58. Said brackets extend forwardly from opposite sides of the forward end of the reciprocating trough 49 and are pivotally connected to a frame 59 secured to the forward end of said reciprocating trough and extending across the bottom thereof and upwardly along opposite sides of said trough beyond the upper sides thereof. Said control lever is provided to position said grip blocks in a position to extend or retract the extensible trough, by reciprocable movement of the conveyer, through links 60 and 61, which also serve to operatively connect said grip blocks with the reciprocating trough of the conveyer, which trough imparts reciprocable movement to said links and grip blocks.

The forward end of the reciprocating trough 49 is slidably mounted on the extensible trough 51 on vertically spaced rollers 63, 63 journaled in opposite sides of the frame 59 and adapted to engage the upper and lower sides of the bearing plates 56, 56.

The connection between the rear end of the reciprocating and extensible troughs includes a pair of brackets 65, 65 depending from the rear of the bearing plates 56, 56 and having rollers 66, 66 mounted thereon and adapted to engage the undersides of the upper flanges of the reciprocating trough 49, to hold said extensible trough in parallel relation with respect to said reciprocating trough.

The rear end of the reciprocating trough 49 is pivotally mounted on the supporting leg 47 on a usual form of ball frame. Said ball frame includes an upper frame member 69, secured to and depending from the bottom of said trough, and a lower frame member 70, pivotally mounted on the upper end of said pivoted supporting leg 47 on a transverse shaft 72. Balls 73, 73 are interposed between said upper and lower frames and forms an anti-friction support for said upper frame on said lower frame, in a well known manner.

Figure 2:
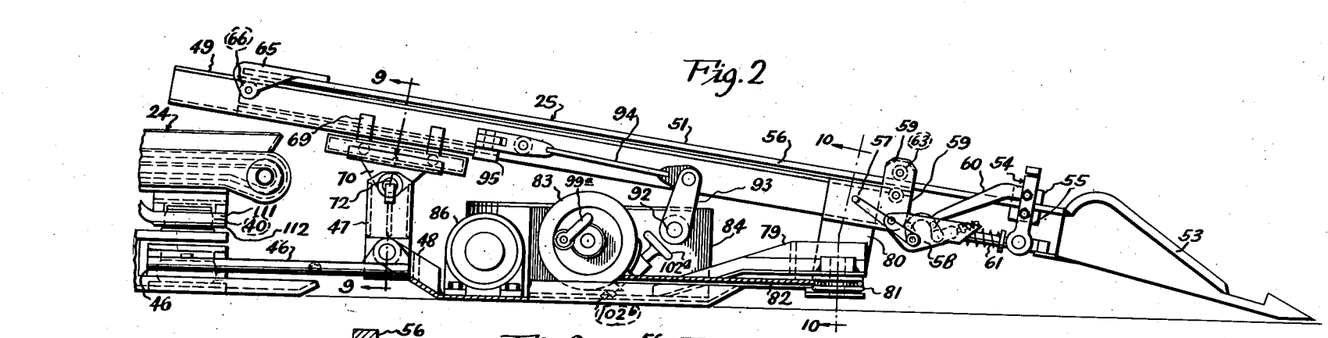
Figure 2 is an enlarged view in side elevation of the forward part of the loading device shown in Figure 1.
Figure 6:
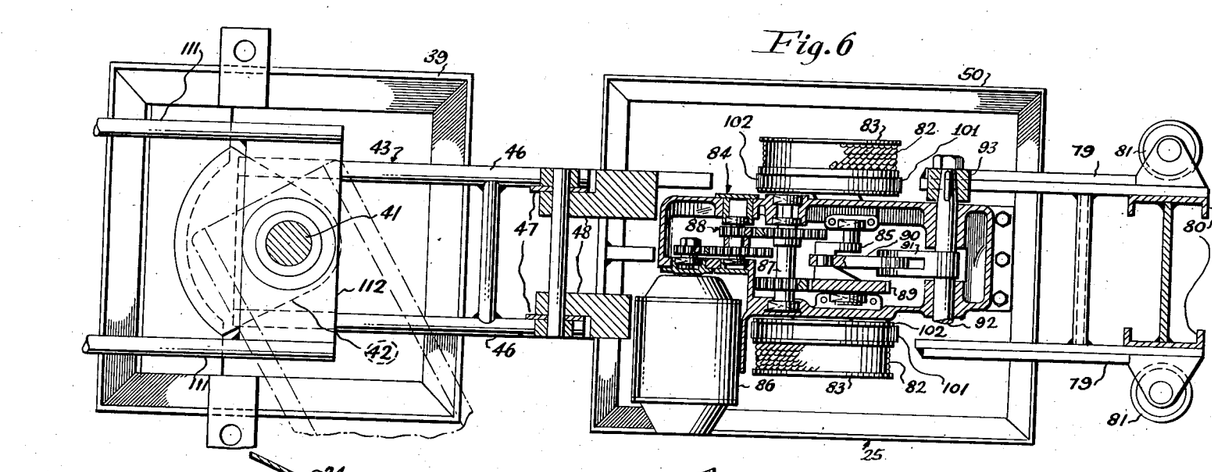
Figure 6 is an enlarged plan view of the forward part of the loading device with the reciprocating trough removed and showing certain parts broken away and certain other parts in horizontal section.
Figure 7:
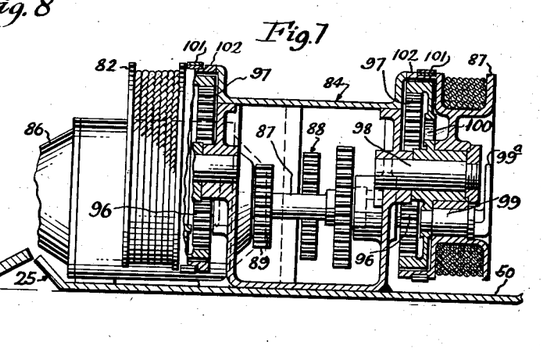
Figure 7 is a transverse sectional view taken through the drive mechanism of the independent loading device.
Figure 10:
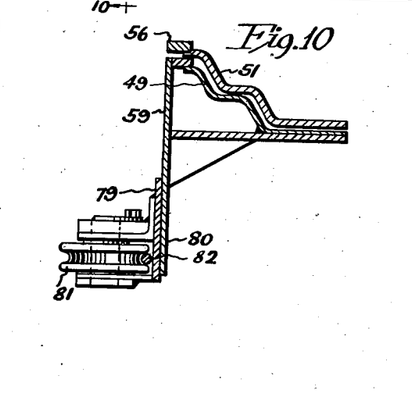
Figure 10 is a partial enlarged fragmentary transverse sectional view taken substantially along line 10—10 of Figure 2.

A pair of parallel spaced guide arms 79, 79 project forwardly from opposite sides of the base 50 and have slidable engagement with guide members 80, 80 forming depending extensions of the sides of the frame 59, to guide the reciprocating trough 49 for reciprocable movement with respect to the base 50 and to laterally move said reciprocating trough, upon lateral movement of said base 50 about the base 39 (see Figures 2 and 10). A guide sheave 81 projects laterally from each of said brackets. Said guide sheaves are adapted to form guides for flexible feeding members 82, 82 extending from winding drums 83, 83 mounted on opposite sides of a casing for a drive mechanism 84, which serves to reciprocably drive the reciprocating and extensible trough sections of the loading device (see Figure 6).

The drive mechanism 84 may be of any well known form and as herein shown includes a crank 85 rotatably driven from a drive motor 86, secured to the casing for said drive mechanism. The drive from said motor to said crank includes a transverse shaft 87 driven from said motor through a gear train indicated generally by reference character 88. Said transverse shaft forms a drive for the winding drums 83, 83 from its opposite ends, in a manner which will hereinafter more clearly appear as this specification proceeds. The crank 85 is driven from said transverse shaft through a pair of meshing spur gears 89. A connecting rod 90 connects said crank with a rocking arm 91 on a transverse shaft 92 for rocking said transverse shaft. A pair of rocking arms 93, 93 are herein shown as being keyed to the ends of said shaft and have driving connection with the reciprocating trough 49 through a pair of drive links 94, 94 extending rearwardly along said trough and universally pivotally connected to opposite ends of a connecting bracket 95, secured to the bottom of and extending laterally beyond opposite sides of said trough in a plane herein shown as being substantially midway between the top and bottom of said trough.

The drive to the winding drums 83, 83 includes a pair of spur pinions 96, 96 keyed to opposite ends of the transverse shaft 87 and meshing with internal gears 97, 97 journaled on their hubs on stub shafts 98, 98, projecting laterally from opposite sides of the casing for said conveyer drive mechanism. The winding drums 83, 83 are journaled on their hubs on the hubs of said internal gears. Each of said winding drums is selectively connected with its associated internal gear to be driven therefrom by means of a pin 99, slidably mounted on said winding drum and adapted to selectively engage one of a plurality of apertures 100, 100 formed in the web of said internal gear, to form a selective drive connection from said gear to said winding drum. A hand lever 99a is mounted on the outer end of each of said pins, to form an operating means therefor.

Friction bands 101, 101 are provided to restrain rotation of the winding drums 83, 83 when disconnected from their respective internal gears. Each of said friction bands is adapted to engage a flanged portion 102 of its associated winding drum. A hand wheel 102a is associated with each friction band 101 to apply or permit said friction band to be released. Said hand wheels are each threaded on a threaded rod 102b having engagement with an end of an associated friction band (see Figure 2). The operative connection between said hand wheels and friction bands is not herein shown or described in detail, since it is no part of my present invention.

The winding drums 83, 83 being capable of being independently driven from the drive mechanism 84, may thus swing the loading device from side to side during the gathering operation, when the ends of their associated cables are attached to fixed members, such as jacks, interposed between the mine roof and floor remote from the loading device, and may also be used to advance or retract the entire mechanism including the stationary base 11, when it is desired to change the position of the loading device.

The drive to the gear 23, for turning said gear and the transfer conveyer 24 about the axis of said gear includes a motor 115 mounted on the base 11. A worm 116 is driven by said motor through a gear train generally indicated by reference character 117. Said worm meshes with a worm gear 118 journaled on a vertical shaft 119. A spur gear 120 is keyed on the lower end of said shaft and meshes with and drives a spur gear 121 keyed on a parallel vertical shaft 122. Said last mentioned spur gear meshes with the teeth of the gear 23 for turning said gear and the transfer conveyer 24 therewith.

The transfer conveyer may thus be turned by power about the axis of the gear 23 to position the gathering unit for gathering material from positions close to the receiving end of the main line conveyor 10. It should here be understood that when said transfer conveyer is moved to either of the extreme positions shown by broken lines in Figure 1, that one of the forward jacks 12 must be removed, the base 11 being held down by three jacks when in this position, which are sufficient to securely hold said base in position on the ground.

It may be seen from the foregoing that the novel arrangement of the loading device is such that the discharge end of the reciprocating trough 49 of the gathering unit will discharge material into the transfer conveyer 24 when displaced laterally with respect thereto about the axis of the shaft 52, when said transfer conveyer is in various angular positions with respect to said main line conveyer; that said transfer conveyer will also discharge material into the main line conveyer when in various positions of lateral adjustment with respect thereto, about the axis of the gear 23; that said transfer conveyer may be moved about the receiving end of said main line conveyer in various directions and degrees by power derived from the motor 115; and that the gathering unit may be independently moved with respect to said transfer conveyer and main line conveyer during the loading operation by power derived from the shaker conveyer drive motor 86.

Figure 1:
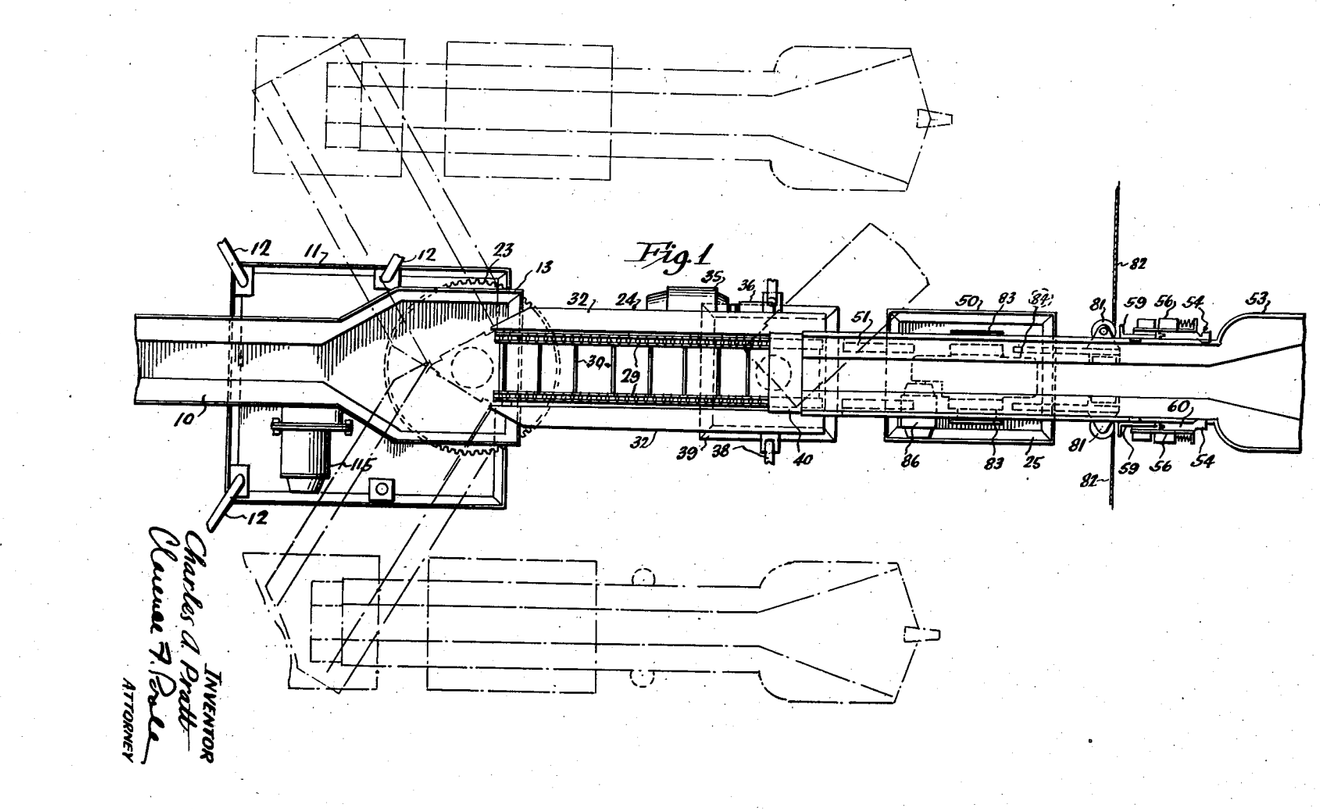
Figure 1 is a plan view of a loading device constructed in accordance with my invention.

It may further be seen that the gathering unit may be positioned to one side or the other of the main line conveyer for loading material from positions close to the receiving end of said main line conveyer, as shown in Figure 1, and may be swung about the receiving end of said transfer conveyer when in such a position. It may also be seen that the transfer conveyer may be so positioned that the gathering unit may pick up material at right angles to the main line conveyer, close to the receiving end thereof, and may be moved towards and from the extended longitudinal center line of the main line conveyer when so positioned.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a conveyer, a stationary base, a main line conveyer mounted at its receiving end on said base and extending therefrom, a mobile shaker conveyer gathering unit controllable as to its location relative to said base and conveyer and adapted to pick up material from the ground, and a connection between said gathering unit and said base, permitting said gathering unit to move relatively to said base and connecting the discharge end of said gathering unit to the receiving end of said conveyer including an endless transfer conveyer arranged in receiving relation with respect to said gathering unit and in discharge relation with respect to said main line conveyer in various positions of said gathering unit with respect to said main line conveyer and forming a material transfer means and controlling link pivotally connecting said gathering unit with said main line conveyer.

2. In a conveyer, a stationary base, a main line conveyer mounted at its receiving end on said base and extending therefrom, a mobile shaker conveyer gathering unit operable independently of said base and conveyer and including a reciprocating shovel, and a connection between said gathering unit and base, permitting said gathering unit to move relatively to said base and connecting the discharge end of said gathering unit to the receiving end of said conveyer including an endless transfer conveyer arranged in receiving relation with respect to said gathering unit and in discharge relation with respect to said main line conveyer in various positions of said gathering unit with respect to said main line conveyer.

3. In a conveyer loading device, a stationary base, a receiving hopper mounted on said base and having a conveyer extending therefrom, a mobile shaker conveyer gathering unit operable independently of said base and conveyer and including a reciprocating shovel adapted to pick up material, and a material carrying connection between said gathering unit and said base for transferring material from said gathering unit to said hopper in various positions of said gathering unit with respect to said hopper, and for holding said gathering unit in fixed spaced relation with respect to said base and connecting said gathering unit to said base for movement about a plurality of parallel spaced vertical axes including an endless transfer conveyer.

4. In a conveyer loading device, a main line conveyer including a reciprocating trough line having a reciprocably movable hopper at its receiving end, a stationary base at the receiving end of said conveyer and forming a support for said hopper, a mobile shaker conveyer gathering unit spaced from said base and movable independently with respect thereto, said gathering unit including a base slidably movable along the ground, a reciprocating shovel mounted on said base and adapted to pick up material from the ground, and an endless transfer conveyer independent of said first conveyer and connecting the discharge end of said gathering unit with the receiving end of said main line conveyer, said transfer conveyer forming a means for connecting said gathering unit with said main line conveyer and for holding said gathering unit in spaced relation with respect thereto, for movement about a pair of parallel spaced vertical axes.

5. In a conveyer loading device, a main line conveyer including a reciprocating trough line having a reciprocably movable hopper at its receiving end, a stationary base at the receiving end of said conveyer and forming a support for said hopper, a mobile shaker conveyer gathering unit spaced from said stationary base and movable independently with respect thereto, said gathering unit including a base slidably movable along the ground, a reciprocating shovel mounted on said base and adapted to pick up material from the ground, an endless transfer conveyer independent of said main line conveyer, a vertical pivotal mounting for the discharge end of said transfer conveyer on said stationary base, and a pivotal connection between the receiving end of said transfer conveyer and said movable base for connecting said gathering unit to said stationary base for pivotal movement with respect thereto about a pair of parallel spaced vertical axes, said transfer conveyer forming a means for transferring material from said gathering unit to said main line conveyer in various positions of said gathering unit with respect to said main line conveyer and forming a control link for controlling the path of movement of said gathering unit along the ground.

6. In a conveyer loading device, a main line conveyer including a reciprocating trough line having a reciprocably movable hopper at its receiving end, a stationary base at the receiving end of said conveyer and forming a support for said hopper, a shaker conveyer gathering unit spaced from said stationary base and independently movable with respect thereto, said gathering unit including a base slidably movable along the ground, a reciprocating shovel mounted on said base and adapted to pick up material from the ground, an endless transfer conveyer independent of said first conveyer, a vertical pivotal mounting for the discharge end of said transfer conveyer on said stationary base, and a pivotal connection between the receiving end of said transfer conveyer and said movable base for connecting said gathering unit to said stationary base for pivotal movement with respect thereto about a pair of parallel spaced vertical axes, said transfer conveyer forming a means for transferring material from said gathering unit to said main line conveyer in various positions of said gathering unit with respect to said main line conveyer and forming a control link for controlling the path of movement of said gathering unit along the ground, and self-contained power means on said stationary base for positively moving said transfer conveyer about its axis of pivotal connection to said base.

7. In a conveyer loading device, a main line conveyer, a stationary base at the receiving end thereof and forming a mounting therefor, a gathering unit spaced from said stationary base and independenely movable with respect thereto, said gathering unit including a base slidably movable along the ground, a shovel mounted on said base and adapted to pick up material from the ground, a transfer conveyer independent of said first conveyer, a vertical pivotal mounting for the discharge end of said transfer conveyer on said stationary base and a pivotal connection between the receiving end of said transfer conveyer and said movable base for connecting said gathering unit to said stationary base for pivotal movement with respect thereto about a pair of parallel spaced vertical axes, said transfer conveyer forming a means for transferring material from said gathering unit to said main line conveyer in various positions of said gathering unit with respect to said main line conveyer and forming a control link for controlling the path of movement of said gathering unit along the ground, power means on said movable base for moving said gathering unit along the ground, and other power means on said stationary base for positively moving said transfer conveyer about its axis of pivotal connection to said base.

8. In a conveyer loading device. a conveyer, a stationary base at the receiving end thereof, a shaker conveyer gathering unit spaced from said base and operable independently thereof, said gathering unit including a base slidably movable along the ground, an extensible shovel mounted on said base for reciprocable movement with respect thereto, means on said base for reciprocably driving said shovel to cause it to pick up material from the ground, other means on said base for moving said base and shovel about the ground under power, an endless transfer conveyer driven independently of said first conveyer and arranged to transfer material from said gathering unit to said first mentioned conveyer, a second movable base forming a support for said transfer conveyer, a linkage connection between said second movable base and said stationary base for pivotally connecting said second movable base to said stationary base, and a linkage connection between said movable bases, for holding said bases in spaced relation with respect to each other, but permitting movement of said first movable base with respect to said stationary base and said second mentioned movable base.

9. In a conveyer loading device, a conveyer, a stationary base at the receiving end thereof, a gathering unit spaced from said base and operable independently thereof, said gathering unit including a base slidably movable along the ground, an extensible shovel mounted on said base for reciprocable movement with respect thereto, means on said base for reciprocably driving said shovel to cause it to pick up material from the ground, other means on said base for moving said base and shovel about the ground under power, a transfer conveyer driven independently of said first conveyer and arranged to transfer material from said gathering unit to said first mentioned conveyer, a second movable base forming a support for said transfer conveyer, a linkage connection between said second movable base and said stationary base for pivotally connecting said second movable base to said stationary base and for holding said bases in fixed spaced relation with respect to each other, a linkage connection between said movable bases, for holding said bases in fixed spaced relation with respect to each other, but permitting movement of said first movable base with respect to said stationary base and said second mentioned movable base, and self-contained power means on said stationary base having positive drive connection with said first linkage connection for swinging said transfer conveyer and second movable base about said stationary base.

10. In a conveyer loading device, a conveyer, a stationary base at the receiving end thereof, a gathering unit spaced from said base and operable independently thereof, said gathering unit including a base slidably movable along the ground, an extensible shovel mounted on said base for reciprocable movement with respect thereto, means on said base for reciprocably driving said shovel to cause it to pick up material from the ground, other means on said base for moving said base and shovel about the ground under power, a transfer conveyer driven independently of said first conveyer and arranged to transfer material from said gathering unit to said first mentioned conveyer in all positions of said gathering unit with respect to said first mentioned conveyer, a second movable base forming a support for the receiving end of said transfer conveyer, a universal linkage connection between said second movable base and said stationary base, for holding said bases in fixed spaced relation with respect to each other but permitting movement of said second movable base about said stationary base along an uneven mine bottom, and a universal linkage connection between said movable bases, for holding said movable bases in fixed spaced relation with respect to each other but permitting movement of said first movable base along an uneven mine bottom with respect to said stationary base and said second movable base.

11. In a conveyer loading device, a conveyer, a stationary base at the receiving end thereof, a gathering unit spaced from said base and operable independently thereof, said gathering unit including a base slidably movable along the ground, an extensible shovel mounted on said base for reciprocable movement with respect thereto, means on said base for reciprocably driving said shovel to cause it to pick up material from the ground, other means on said base for moving said base and shovel about the ground under power, a transfer conveyer driven independently of said first conveyer and arranged to transfer material from said gathering unit to said first mentioned conveyer in all positions of said gathering unit with respect to said first mentioned conveyer, a second movable base forming a support for the receiving end of said transfer conveyer, a universal linkage connection between said second movable base and said stationary base, for holding said bases in fixed spaced relation with respect to each other but permitting movement of said second movable base about said stationary base along an uneven mine bottom, a universal linkage connection between said movable bases, for holding said movable bases in fixed spaced relation with respect to each other but permitting movement of said first movable base along an uneven mine bottom with respect to said stationary base and said second movable base, and self-contained power means on said stationary base having positive drive connection with said first mentioned linkage connection for swinging said second mentioned base about its vertical axis of connection to said stationary base.

12. In a conveyer loading device, a conveyer, a stationary base at the receiving end thereof, a gathering unit spaced from said base and operable independently thereof, said gathering unit including a base slidably movable along the ground, an extensible shovel mounted on said base for reciprocable movement with respect thereto, means on said base for reciprocably driving said shovel to cause it to pick up material from the ground, a transfer conveyer driven independently of said first conveyer and arranged in receiving and discharge relation with respect to said extensible shovel and first mentioned conveyer, to transfer material from said gathering unit to said first mentioned conveyer, a second movable base forming a support for the receiving end of said transfer conveyer, a linkage connection between said movable bases for holding said bases in fixed spaced relation with respect to each other but permitting movement of said first movable base about said second base, a universal pivotal connection between said second movable base and said stationary base including a gear mounted on said base for pivotal movement with respect thereto about a vertical axis, a link transversely pivoted to said gear, a support for said transfer conveyer pivotally supported on said link for movement about an axis extending longitudinally of the conveyer, a vertical pivotal connection between said support and said second movable base, and power means on said stationary base for turning said gear to laterally move said second movable base and conveyer with respect to said stationary base.

13. In a conveyer loading device, a conveyer, a stationary base at the receiving end thereof, a gathering unit spaced from said base and operable independently thereof, said gathering unit including a base slidably movable along the ground, an extensible shovel mounted on said base for reciprocable movement with respect thereto, means on said base for reciprocably driving said shovel to cause it to pick up material from the ground, a transfer conveyer driven independently of said first conveyer and arranged in receiving and discharge relation with respect to said extensible shovel and first mentioned conveyor to transfer material from said gathering unit to said first mentioned conveyer, a second movable base forming a support for the receiving end of said transfer conveyer, a linkage connection between said movable bases for holding said bases in fixed spaced relation with respect to each other but permitting movement of said first movable base about said second base, a universal pivotal connection between said second movable base and said stationary base including a gear mounted on said base for pivotal movement with respect thereto about a vertical axis, a link transversely pivoted to said gear, a support for said transfer conveyer pivotally supported on said link for movement about an axis extending longitudinally of the conveyer, a vertical pivotal connection between said support and said second movable base, and self-contained power means on said stationary base having positive drive connection with said gear for laterally swinging said movable base and conveyer along the ground with respect to said stationary base, said power means including a self-locking worm and worm gear for holding said transfer conveyer in various desired positions with respect to said stationary base.

14. In a conveyer loading device, a conveyer, a stationary base at the receiving end thereof, a gathering unit spaced from said base and operable independently thereof, said gathering unit including a base slidably movable along the ground, a shovel mounted on said base for reciprocable movement with respect thereto, means on said base for reciprocably driving said shovel to cause it to pick up material from the ground, a transfer conveyer driven independently of said first conveyer and arranged in receiving and discharge relation with respect to said shovel and said first mentioned conveyer, to transfer material from said gathering unit to said first mentioned conveyer, a second movable base forming a support for the receiving end of said transfer conveyer, a linkage connection between said movable bases for holding said bases in fixed spaced relation with respect to each other but permitting movement of said first movable base about said second base, a universal pivotal connection between said second movable base and said stationary base including a gear mounted on said base for pivotal movement with respect thereto about a vertical axis, a link transversely pivoted to said gear, a support for said transfer conveyer pivotally supported on said link for movement about an axis extending longitudinally of the conveyer, a vertical pivotal connection between said support and said second movable base, power means on said stationary base for turning said gear to laterally move said second movable base and conveyer with respect to said stationary base, and power means on said first mentioned movable base for moving said gathering unit independently about said transfer conveyer.

15. In a conveyer loading device, a main line conveyer, a stationary base at the receiving end thereof having the receiving end of said conveyer mounted thereon, a second base spaced from said stationary base and slidably movable along the ground with respect thereto, a conveyer mounted on and extending beyond the forward end of said slidably movable base, a transfer conveyer for transferring material from said second mentioned conveyer to said first mentioned conveyer, said transfer conveyer being mounted on said first mentioned base for pivotal movement with respect thereto about a vertical axis and having vertical pivotal connection with said slidably movable base, power means on said slidably movable base, for moving said base and associated conveyer along the ground, and self-contained power means on said stationary base for positively moving said transfer conveyer about its axis of pivotal connection to said stationary base and for moving said slidably movable base therewith, to position said base and associated conveyer to either side of said main line conveyer.

CHARLES A. PRATT.